(12) United States Patent
Chakar et al.

(10) Patent No.: US 8,916,496 B2
(45) Date of Patent: Dec. 23, 2014

(54) THERMALLY-RESPONSIVE RECORD MATERIAL

(71) Applicants: Fadi Selim Chakar, Appleton, WI (US); Mark Robert Fisher, Appleton, WI (US)

(72) Inventors: Fadi Selim Chakar, Appleton, WI (US); Mark Robert Fisher, Appleton, WI (US)

(73) Assignee: Appvion, Inc., Appleton, WI (US)

( * ) Notice: Subject to any disclaimer, the term of this patent is extended or adjusted under 35 U.S.C. 154(b) by 0 days.

(21) Appl. No.: 14/051,906

(22) Filed: Oct. 11, 2013

(65) Prior Publication Data

US 2014/0263673 A1    Sep. 18, 2014

Related U.S. Application Data

(63) Continuation-in-part of application No. 13/803,824, filed on Mar. 14, 2013.

(51) Int. Cl.
| | |
|---|---|
| *B41M 5/327* | (2006.01) |
| *B41M 5/333* | (2006.01) |
| *B41M 5/337* | (2006.01) |
| *G06K 19/06* | (2006.01) |

(52) U.S. Cl.
CPC .......... *B41M 5/3336* (2013.01); *B41M 5/3375* (2013.01); *G06K 19/06028* (2013.01); *B41M 5/3275* (2013.01)

USPC ........... 503/209; 503/216; 503/217; 503/221

(58) Field of Classification Search
CPC . B41M 5/3275; B41M 5/3336; B41M 5/3375
USPC .................................. 503/209, 216, 217, 221
See application file for complete search history.

(56) References Cited

FOREIGN PATENT DOCUMENTS

JP          06-191154      *    7/1994

* cited by examiner

*Primary Examiner* — Bruce H Hess
(74) *Attorney, Agent, or Firm* — Benjamin Mieliulis (57) ABSTRACT

The invention describes an improved thermally-responsive record material substantially free of aromatic isocyanate yielding an image of high intensity and useful for bar codes. The record material comprises a support having provided thereon a heat-sensitive composition comprising a substantially colorless color former comprising a fluoran; and a developer material selected from the group consisting of 4,4'-diaminodiphenylsulfone and 3,3'-diaminodiphenylsulfone, and an organic acid which upon being heated reacts with said color former to develop color, and including a binder material. Optionally, a modifier compound is included in the heat-sensitive composition. The compound can be selected from the group consisting of a fatty acid amide, such as stearmide. Optionally, magnesium state is included.

21 Claims, 4 Drawing Sheets

Maximum intensity profile of diaminodiphenyl sulfone systems in the presence and absence of organic acids at various coat weights.
WOC = weight of coat.

FIGURE 1

Maximum intensity profile of diaminodiphenyl sulfone systems in the presence and absence of organic acids at various coat weights.
WOC = weight of coat.

FIGURE 2

Maximum image intensity of 4,4'-diaminodiphenyl sulfone systems in the absence of an organic acid at various coat weights, highlighting an intensity plateau.

FIGURE 3

Effect of fillers on maximum intesnity of 4,4'-diaminodiphenyl sulfone and organic acid systems.

FIGURE 4

Depiction of various 4,4'-diaminodiphenyl sulfone/organic acid systems relative to a 4,4'-diaminodiphenyl sulfone system void of an acid. All systems shown above incorporated magnesium stearate as the filllr and dye 1 as the color former.

THERMALLY-RESPONSIVE RECORD MATERIAL

CROSS-REFERENCE TO RELATED APPLICATION

This application under 35 USC §111(a) is a continuation-in-part and claims benefits per 35 USC §120 to U.S. application Ser. No. 13/803,824 filed Mar. 14, 2013, now pending, and incorporated herein by reference.

FIELD OF THE INVENTION

This invention relates to a thermally-responsive record material. It more particularly relates to such record material of the type in the form of sheets coated with color-forming systems comprising chromogenic material (electron-donating dye precursors) and typically acidic color developer material. This invention particularly concerns a thermally-responsive record material capable of forming a substantially non-reversible image resistant to fade or erasure and useful for producing dark images or functional bar codes. The invention teaches an improved thermally-sensitive record material which when imaged exhibit useful image properties.

DESCRIPTION OF THE RELATED ART

Thermally-responsive record material systems are well known in the art and are described in many patents, for example. U.S. Pat. No. 3,539,375 Baum; U.S. Pat. No. 3,674,535 Blose et al., U.S. Pat. No. 3,746,675 Blose et al., U.S. Pat. No. 4,151,748 Baum; U.S. Pat. No. 4,181,771 Hanson et al; U.S. Pat. No. 4,246,318 Baum, and U.S. Pat. No. 4,470,057 Glanz which are incorporated herein by reference. In these systems, basic colorless or lightly colored chromogenic material and acidic color developer material are contained in a coating on a substrate which, when heated to a suitable temperature, melts or softens to permit said materials to react, thereby producing a colored mark.

Thermally-responsive record materials have characteristic thermal response, desirably producing a colored image of sufficient intensity upon selective thermal exposure.

A need exists in the industry for thermally responsive record materials that are considered more environmentally friendly. A thermally-imaging formulation that can produce an image when heated to a suitable temperature and be more acceptable in the marketplace from environmental or safety considerations would be useful commercially.

Thermally-responsive record materials are utilized in diverse application including for labeling, facsimile, point of sale printing, printing of tags and pressure sensitive labels.

Kawakami, U.S. Pat. No. 5,464,804 teaches a thermal recording material wherein colorless dye is combined with an isocyanate and an amino compound. Similarly Shimura et al., U.S. Pat. No. 5,079,211 teaches forming a heat sensitive recording material by combining a fluoran compound with an aromatic isocyanate and an imino compound having at least one >C=NH which reacts with the isocyanate compound upon application of heat to form a color.

Shimura's isocyanate compounds are aromatic or heterocyclic isocyanate compounds such as also disclosed in Kabashima et al., U.S. Pat. No. 4,521,793. An aromatic isocyanate is reacted with an imino compound having at least one >C=NH group to effect color formation. In each case the isocyanate is reacted with the imino compound to form a complex that reacts with the dye.

The present invention is a departure from preceding art by foregoing the use of isocyanate materials. Isocyanates are disfavored in some environments and can even be hazardous. A thermally imaging system substantially-free of isocyanate would be commercially useful. Additionally the present invention advantageously provides an alternative to the typical phenolic developer common employed.

DETAILED DESCRIPTION

The invention teaches the use of a combination of non-phenolic developers for thermal sensitive recording materials. More specifically, this invention relates to using 4,4'-diaminodiphenyl sulfone and 3,3'-diaminodiphenyl sulfone and/or a mixture of both developers and a leuco dye and further comprising an organic acid which can be an aliphatic, cyclic or aromatic acid.

The present invention teaches that the intensity of leuco dye systems can be improved when reacted with 4,4'-diaminodiphenyl sulfone or 3,3' diaminodiphenyl sulfone.

For ease of reference, 3,3'-diaminodiphenyl sulfone is sometimes referred to herein as Developer 3,3'. 4,4'-diaminodiphenyl sulfone is sometimes referred to as Developer 4,4'.

4,4'-DIAMINODIPHENYL SULFONE
(Developer 4,4')

3,3'-DIAMINODIPHENYL SULFONE
(Developer 3,3')

The invention describes a thermally-responsive record material substantially free of aromatic isocyanate. The record material comprises a support having provided thereon a heat-sensitive composition comprising a substantially colorless dye precursor comprising a leuco compound, a developer material and the organic acid. The developer material is selected from the group consisting of 4,4'-diaminodiphenyl sulfone and 3,3'-diaminodiphenyl sulfone, which upon being heated reacts with said dye precursor to develop color, and including a binder material. An optional modifier compound can also be employed. The optional modifier compound can be selected from the group consisting of a fatty acid amide such as stearamide wax, 1,2-diphenoxy ethane or dimethyl diphenoxy ethane, dimethyl phthalate. Optionally a filler such as calcium stearate, magnesium stearate, calcium carbonate, clays, kaolin and pigments can also be incorporated. Stearates such as magnesium stearate in one aspect are useful at up to 10% by weight, at from 10% to 15% by weight on in another aspect from 5% to 13% by weight, or from 5% even up to 13%, or even up to 20%, or even up to 30% by weight based on weight of the heat sensitive coating.

The organic acid is a compound selected from organic acids according to formula (1)

wherein each $R^1$ is independently selected from carboxy, hydrogen or a hydroxyl group, and wherein n is an integer from 1 to 2 or even from 1 to 4.

$R^2$ is selected from carboxy, alkoxy, alkenecarboxy, alkylcarboxy, alkanoate, and alkyl alkanoate.

An exemplary list of organic acids according to formula 1 include:

In a further aspect, the organic acid is an aliphatic or cylic organic acid. Exemplary aliphatic or cyclic organic acids include lactic acid and alkanedienoic acids such as 2,4-hexanedienoic acid or sorbic acid; alkanedioic acids such as butanedioic acid or succinic acid; hydroxyalkane tricarboxylic acids such as citric acid; dihydroxyfuran ones such as ascorbic acid, whether racemate, or d- or l- enantiomers.

The thermally imaging system of the invention yields a thermal image that can be read visually and/or can be decodable electronically such as in the form of a thermal barcode.

Electron-donating dye precursors are color formers generally known and commonly referred to as leuco dyes. For purpose of the invention, when referring to "colorless dye precursor" or "color former", the terms are used interchangeably and are intended to encompass leuco dyes and chromogens include chormogenic compounds such as the pthhalide, leucoauramine and fluoroan compounds. These color formers are chromogenic materials or electron donating dye precursors and are well known colorless or slightly colored color-forming compounds for use in color-forming record systems. Examples of the compounds include Crystal Violet Lactone (3,3-bis(4-dimethylaminophenyl)-6-dimethylaminophthalide), (U.S. Pat. No. RE 23,024); phenyl-, indolyl, pyrrolyl, and carbazolyl-substituted phthalides (for example, in U.S. Pat. Nos. 3,491,111; 3,491,112; 3,491,116; 3,509,174); nitro-, amino-, amido-, sulfonamido-, aminobenzylidene-, halo-, anilino-substituted fluorans (for example, the U.S. Pat. Nos. 3,624,107; 3,627,78; 3,641,011; 3,642,828; 3,681,390); spirodipyrans (U.S. Pat. No. 3,971,808); and pyridine and pyrazine compounds (for example, in U.S. Pat. Nos. 3,775,424 and 3,853,869). Other specifically eligible chromogenic compounds, not limiting the invention in any way, are: 3-diethylamino-6-methyl-7-anilino-flouran (U.S. Pat. No. 4,510,513); 3-dibutylamino-6-methyl-7-anilino-fluoran; 3-dibutylamino-7-(2-chloroanilino) fluoran; 3-(N-ethyl-N-tetrahydrofurfurylamino)-6-methyl-7-3,5'6-tris(dimethylamino) spiro[9H-fluorene-9,1'(3'H)-isobenzofuran]-3'-one; 7-(1-ethyl-2-methylindole-3-yl)-7-(4-diethylamino-2-ethoxyphenyl)-5,7-dihydrofuro[3,4-b]pyridin-5-one (U.S. Pat. No. 4,246,318); 3-diethylamino-7-(2-chloroanilino)fluoran (U.S. Pat. No. 3,920,510); 3-(N-methylcyclohexylamino)-6-methyl-7-anilinofluoran (U.S. Pat. No. 3,959,571); 7-(1-octyl-2-methylindole-3-yl)-7-(4-diethylamino-2-ethoxyphenyl)-5,7-dihydrofuro[3,4-b]pyridin-5-one; 3-diethylamino-7,8-benzofluoran; 3,3-bis(1- ethyl-2-methylindole-3-yl)phthalide; 3-diethylamino-7-anilinofluoran; 3-diethylamino-7-benzylaminofluoran; 3'-phenyl-7-dibenzylamino-2,2'-spirodi-[2H-1-benzopyran] and mixtures of any of the following.

In a further embodiment the invention comprises a thermally-responsive record material, wherein the substantially colorless dye precursor comprises a fluoran compound of the formula wherein $R_1$ is hydrogen or alkyl wherein $R_2$ is hydrogen or alkaryl;

wherein $R_3$ is aryl when $R_2$ is hydrogen, or alkaryl when $R_2$ is alkaryl;

$R_4$ and $R_5$ are each independently selected from alkyl, aralkyl; or $R_4$ and $R_5$ form a four carbon ring pyrrolidine structure.

In a yet further embodiment, in the thermally-responsive record material described the fluoran is selected from the group consisting of:

1

2

3

4

5

6

7

For convenience, the above dye precursors ("color formers") are referred to herein as the respective "dye," by the structure number (e.g. "dye 1," "dye 2," "dye 3," "dye 4," "dye 5," "dye 6," and "dye 7."

The record material according to the invention has a non-reversible image in that it is non-reversible under the action of heat. The coating of the record material of the invention is basically a dewatered solid at ambient temperature.

The color-forming system of the record material of this invention comprises the electron donating dye precursors, also known as chromogenic material, in its substantially colorless state together with an acidic developer material. The color-forming system relies upon melting, softening, or subliming one or more of the components to achieve reactive, color-producing contact with the chromogen. Substantially colorless for purposes of the invention is understood to mean colorless or lightly or faintly colored.

The record material includes a substrate or support material which is generally in sheet form. For purposes of this invention, sheets can be referred to as support members and are understood to also mean webs, ribbons, tapes, belts, films, cards and the like. Sheets denote articles having two large surface dimensions and a comparative small thickness dimension. The substrate or support material can be opaque, transparent or translucent and could, itself, be colored or not. The material can be fibrous including, for example, paper and filamentous synthetic materials. It can be a film including, for example, cellophane and synthetic polymeric sheets cast, extruded, or otherwise formed. The invention resides in the color-forming composition coated on the substrate. The kind or type of substrate material is not critical. In some embodiments neutral sized base paper is a preferred substrate.

The components of the heat sensitive coating are in substantially contiguous relationship, substantially homogeneously distributed throughout the coated layer or layers deposited on the substrate. For purposes of this invention the term substantially contiguous is understood to mean that the color-forming components are positioned in sufficient proximity such that upon melting, softening or subliming one or more of the components, a reactive color-forming contact between the components is achieved. As is readily apparent to the person of ordinary skill in this art, these reactive components accordingly can be in the same coated layer or layers, or individual components positioned in separate layers using multiple layers. In other words, one component can be positioned in the first layer, and developer or modifier or sensitizer components positioned in a subsequent layer or layers. All such arrangements are understood herein as being substantially contiguous.

The developer to dye precursor ratio by weight is maintained, at from 1:1 to about 4:1, or even from 0.1:1 to about 3:1, or even from 0.5:1 to about 2.5:1 or even from about 0.5:1 to about 5:1. Preferably the developer to dye precursor ratio is from about 1:1 to about 3:1. The modifier to dye precursor ratio by weight is preferably maintained at greater than 1:1, or even from 0.2:1 to about 2.5:1, or even from about 0.1:1 to about 3:1, or even from 0.1:1 to about 4:1.

In manufacturing the record material, a coating composition is prepared which includes a fine dispersion of the components of the color-forming system, and binder material, preferably polymeric binder such as polyvinyl alcohol. The composition of the invention can optionally include or be free of pigments including clays and fillers. Preferably, pigments, if included, are maintained at less than 13%, or even less than 20%, or even less than 30%, by weight of the heat sensitive coating composition of the invention.

The dispersion of the organic acids can be prepared by milling or milling in combination with the developer or in combination with the fillers or modifier prior to blending into a final coating. Optionally, the organic acid can be prepared as a solution instead of milling.

4,4'-diaminodiphenyl sulfone and 3,3'-diaminophenyl sulfone, respectively, in the presence of a color former (leuco dye) can yield an image readable to the human eye and a barcode that could be scanned. The system can be further optimally enhanced by selecting a modifier, such as a stearamide wax. The image intensity can be enhanced with the selection of leuco dyes, particularly of the fluoran class of color formers. A filler such as magnesium stearate can also be included.

In this invention, intensity is improved by introducing organic acids into the system. The organic acids, can be phenolic or non-phenolic in nature, cyclic or aliphatic, aromatic or, alkane type. Organic acids include ascorbic acid, citric acid, coumaric acid, salycilic acid, vanillic acid, cinnamic acid, o-acetyl salycilic acid, 3-(4-hydroxyphenyl)propionic acid, 3-(2-hyroxyphenyl propionic acid), 3,4-dihydroxyphenyl acetic acid. Other structures that could be used include vanillic acid, cinnamic acid, succinic acid, lactic acid and sorbic acid.

The heat-sensitive coating composition can additionally contain pigments, such as clay, talc, silicon dioxide, aluminum hydroxide, calcined kaolin clay and calcium carbonate, and urea-formaldehyde resin pigments at from 0 to 10% or even from 0 to 20% or even 0 to 30% by weight of the heat-sensitive coating. Other optional materials include natural waxes, Carnauba wax, synthetic waxes, lubricants such as zinc stearate; wetting agents; defoamers, modifiers and antioxidants. The modifier typically does not impart any image on its own but as a relatively low melt point solid, acts as a solvent to facilitate reaction between the mark-forming components of the color-forming system. Optionally the thermally-sensitive record material can be top coated with a polymeric material forming a top coating. Materials such as polyvinyl alcohol or any of various binder materials can also be used for this purpose.

The color-forming system components are substantially insoluble in the dispersion vehicle (preferably water) and are ground to an individual average particle size of less than 10 microns, preferably less than 3 microns. The polymeric binder material is substantially vehicle soluble although latexes are also eligible in some instances. Preferred water soluble binders, which can also be used as topcoats, include polyvinyl alcohol, hydroxy ethylcellulose, methylcellulose, methyl-hydroxypropylcellulose, starch, modified starches, gelatin and the like. Eligible latex materials for the binder and/or topcoat include polyacrylates, styrene-butadiene-rubber latexes, styrene acrylics, polyvinylacetates, polystyrene, and the like. The polymeric binder is used to protect the coated materials from brushing and handling forces occasioned by storage and use of thermal sheets. Binder should be present in an amount to afford such protection and in an amount less than will interfere with achieving reactive contact between color-forming reactive materials.

Coating weights can effectively be about 1 to about 9 grams per square meter (gsm) or even from 0.5 to about 10 gsm and preferably about 3 to about 6 gsm and more preferably from 3 to 5 gsm. The practical amount of color-forming materials is controlled by economic considerations, functional parameters and desired handling characteristics of the coated sheets.

The thermally response record material of the invention is particularly advantageous for bar codes. Bar codes provide a convenient means for computerized inventory or goods handling and tracking. To function properly, it is necessary that the bar code have high print contrast signal, and that the thermally-responsive material on which the bar code is imaged resist unwanted bar width growth after imaging. The characters or bars must not only be intensely imaged, but must be sharp, and unbroken or free of pin holes. It is also necessary that when read by a scanner that a high percentage of scans result in successful decoding of the information in the bar code. The percentage of successful decodes of the bar code information must be maintained at a high value for the thermally-responsive record material to gain wide commercial acceptance for use in bar coding applications.

To form a bar code, the heat sensitive layer on the support is imaged by selective application of heat in the pattern of a bar code. The thermally responsive record material composition described herein enables imaging on the record material of an improved bar code of any type, including one and two dimension pattern bar codes. Bar codes are well known and typically comprise a plurality of uniformly spaced apart parallel vertical lines, often of differing thicknesses forming a row extending from a common horizontal axis. The horizontal axis is generally not shown but is a convenient reference point for descriptive purposes. The spaced apart parallel neutral lines are arranged in a row. Bar codes are a machine readable representation of data and can be one dimension or two dimension patterns, graphics, or other imaged patterns relying on interpretive software to decode the bar code when scanned.

The following examples are given to illustrate some of the features of the present invention and should not be considered as limiting. In these examples all parts or proportions are by weight and all measurements are in the metric system, unless otherwise stated.

In all examples illustrating the present invention a dispersion of a particular system component can be prepared by milling the component in an aqueous solution of the binder until a particle size of less than 10 microns is achieved. The milling was accomplished in an attritor or other suitable milling device. The desired average particle size was less than 3 microns in each dispersion.

The thermally-responsive sheets were made by making separate dispersions of chromogenic material, modifier material, and developer material. The dispersions are mixed in the desired ratios and applied to a support with a wire wound rod and dried. Other materials such as fillers, antioxidants, lubricants and waxes can be added if desired. The sheets may be calendered to improve smoothness.

The abbreviations and dye precursor numbers correspond to the following materials:

TABLE 1

| Dye, Formula # | |
| --- | --- |
| dye 1 | 3-diethylamino-6-methyl1-7-(2',4'dimethyl aniline) fluoran |
| dye 2 | 3-dibutylamino-6-methyl-7-anilino fluoran |
| dye 3 | 3-diethylamino-6-methyl-7-(3'-methylanilino) fluoran |
| dye 4 | 3-diethylamino-6-methyl-7-anilinofluoran |
| dye 5 | 3-(N-ethyl-N-p-tolylamino)-6-methyl-y-anilino fluoran |
| dye 6 | 3-pyrrolidino-6-methyl-7-anilino fluoran |
| dye 7 | 3-diethylamino-7-(dibenzylamino) fluoran |
| Selvol 125, Sekisui Chemical Co., Ltd., Tokyo, Japan | Polyvinyl alcohol |

TABLE 2

| | THERMAL SYSTEM | | | | | | 1st bar Gretag | |
| --- | --- | --- | --- | --- | --- | --- | --- | --- |
| Example | Developer | Organic Acid | Modifier | Filler | Leuco Dye | WOC #/ream | Intensity o.d. | Brightness UVEX |
| 1 | Developer 4,4' | — | stearamide wax | — | dye 1 | 3.0 | 0.83 | 89.0 |
| 2 | Developer 4,4' | 3-(4-hydroxyphenyl) propionic acid | stearamide wax | — | dye 1 | 3.0 | 1.53 | 89.0 |
| 3 | Developer 4,4' | — | stearamide wax | CaCO$_3$ | dye 1 | 4.6 | 0.90 | 89.0 |
| 4 | — | 3-(4-hydroxyphenyl) propionic acid | stearamide wax | CaCO$_3$ | dye 1 | 4.9 | 0.63 | 87.3 |
| 5 | Developer 4,4' | — | stearamide wax | magnesium stearate | dye 1 | 5.6 | 0.70 | 89.0 |
| 6 | Developer 4,4' | 3-(4-hydroxyphenyl) propionic acid | stearamide wax | CaCO$_3$ | dye 1 | 4.8 | 1.34 | 88.4 |
| 7 | Developer 4,4' | 3-(4-hydroxyphenyl) propionic acid | stearamide wax | magnesium stearate | dye 1 | 5.0 | 2.05 | 84.0 |
| 8 | Developer 4,4' | 3-(4-hydroxyphenyl) propionic acid | stearamide wax | magnesium hydroxide | dye 1 | 5.4 | 1.50 | 88.0 |
| 9 | Developer 4,4' | 3-(4-hydroxyphenyl) propionic acid | stearamide wax | CaCO$_3$ | dye 1 | 3.1 | 1.00 | 89.0 |
| 10 | Developer 4,4' | 3-(4-hydroxyphenyl) propionic acid | stearamide wax | magnesium stearate | dye 1 | 3.2 | 1.60 | 85.7 |
| 11 | Developer 4,4' | 3-(4-hydroxyphenyl) propionic acid | stearamide wax | magnesium hydroxide | dye 1 | 2.8 | 1.20 | 88.7 |
| 12 | Developer 4,4' | 3-(4-hydroxyphenyl) propionic acid | stearamide wax | zinc stearate | dye 1 | 2.6 | 1.50 | 89.6 |
| 13 | Developer 4,4' | 3-(4-hydroxyphenyl) propionic acid | stearamide wax | calcium stearate | dye 1 | 2.8 | 1.40 | 84.1 |
| 14 | Bis S | 3-(4-hydroxyphenyl) propionic acid | stearamide wax | CaCO$_3$ | dye 1 | 3.7 | 2.49 | 78.0 |
| 15 | Bis S | 3-(4-hydroxyphenyl) propionic acid | stearamide wax | magnesium stearate | dye 1 | 3.6 | 2.48 | 69.6 |

TABLE 2-continued

| | THERMAL SYSTEM | | | | | 1st bar Gretag | |
|---|---|---|---|---|---|---|---|
| Example | Developer | Organic Acid | Modifier | Filler | Leuco Dye | WOC #/ream | Intensity o.d. | Brightness UVEX |
| 16 | Developer 4,4' | coumaric acid | stearamide wax | CaCO$_3$ | dye 1 | 2.7 | 1.23 | 89.1 |
| 17 | Developer 4,4' | coumaric acid | stearamide wax | magnesium stearate | dye 1 | 2.6 | 1.43 | 89.1 |
| 18 | Developer 4,4' | coumaric acid | stearamide wax | magnesium hydroxide | dye 1 | 2.6 | 1.19 | 88.7 |
| 19 | Developer 4,4' | coumaric acid | stearamide wax | zinc stearate | dye 1 | 2.6 | 1.65 | 89.1 |
| 20 | Developer 4,4' | coumaric acid | stearamide wax | calcium stearate | dye 1 | 2.6 | 1.41 | 89.3 |
| 21 | Developer 4,4' | 3-(4-hydroxyphenyl) propionic acid | stearamide wax | CaCO$_3$ | dye 1 | 2.4 | 1.01 | 88.9 |
| 22 | Developer 4,4' | 3-(4-hydroxyphenyl) propionic acid | stearamide wax | magnesium stearate | dye 1 | 2.2 | 1.38 | 86.4 |
| 23 | Developer 4,4' | ascorbic acid | stearamide wax | CaCO$_3$ | dye 1 | 2.5 | 0.90 | 82.4 |
| 24 | Developer 4,4' | ascorbic acid | stearamide wax | magnesium stearate | dye 1 | 2.1 | 1.08 | 84.9 |
| 25 | Developer 4,4' | coumaric acid | stearamide wax | CaCO$_3$ | dye 1 | 2.6 | 1.34 | 88.8 |
| 26 | Developer 4,4' | coumaric acid | stearamide wax | magnesium stearate | dye 1 | 2.4 | 1.43 | 88.9 |
| 27 | Developer 4,4' | 3,4-dihydroxyphenyl acetic acid | stearamide wax | CaCO$_3$ | dye 1 | 2.3 | 0.93 | 80.9 |
| 28 | Developer 4,4' | 3,4-dihydroxyphenyl acetic acid | stearamide wax | magnesium stearate | dye 1 | 2.4 | 1.37 | 79.5 |
| 29 | Developer 4,4' | 3-(2-hydroxyphenyl) propionic acid | stearamide wax | CaCO$_3$ | dye 1 | 2.4 | 1.00 | 89.0 |
| 30 | Developer 4,4' | 3-(2-hydroxyphenyl) propionic acid | stearamide wax | magnesium stearate | dye 1 | 2.2 | 1.38 | 84.8 |
| 31 | Developer 4,4' | salicylic acid | stearamide wax | CaCO$_3$ | dye 1 | 2.4 | 1.07 | 84.8 |
| 32 | Developer 4,4' | salicylic acid | stearamide wax | magnesium stearate | dye 1 | 2.5 | 1.29 | 83.6 |
| 33 | Developer 4,4' | citric acid | stearamide wax | CaCO$_3$ | dye 1 | 2.3 | 0.70 | 89.1 |
| 34 | Developer 4,4' | citric acid | stearamide wax | magnesium stearate | dye 1 | 2.1 | 1.30 | 85.0 |
| 35 | — | o-acetyl salicylic acid | stearamide wax | magnesium stearate | dye 1 | 2.5 | 0.40 | 88.6 |
| 36 | Developer 4,4' | o-acetyl salicylic acid | stearamide wax | magnesium stearate | dye 1 | 1.7 | 1.00 | 86.5 |
| 37 | Developer 4,4' | o-acetyl salicylic acid | stearamide wax | magnesium stearate | dye 1 | 2.7 | 1.37 | 85.9 |

/ream is pounds per ream based on a 3300 sq. ft. ream. 1 lb per 3300 sq. ft.-0.45 kg/306.58 sq. meters.

| CHRMOGENIC DISPERSIONS | |
|---|---|
| Material | Parts |
| DISPERSION A - CHROMOGENIC MATERIAL - dye-1 | |
| chromogenic material (dye 1) | 34.0 |
| binder, 20% solution of polyvinyl alcohol | 27.0 |
| dispersing and defoaming agents | 4.0 |
| water | 35.0 |
| DISPERSION B - DEVELOPER MATERIAL | |
| developer | 39.0 |
| binder, 20% solution of polyvinyl alcohol | 24.0 |
| dispersing and defoaming agents | 0.5 |
| water | 36.5 |
| Dispersion B1 - 4,4'-diaminodipheryl sulfone | |
| Dispersion B2 - bisphenol S | |
| DISPERSION C - MODIFIER MATERIAL - stearamide wax | |
| stearamide wax | 25.0 |
| binder, 20% solution of polyvinyl alcohol | 20.0 |
| dispersing and defoaming agents | 1.0 |
| water | 54.0 |

CHROMOGENIC DISPERSIONS

DISPERSION D -

| | |
|---|---|
| organic acid | 16.0 |
| binder, 20% solution of polyvinyl alcohol | 15.0 |
| dispersing and defoaming agents | 1.5 |
| water | 67.5 |

Dispersion D1 - organic acid is coumaric acid
Dispersion D2 - organic acid is salycilic acid
Dispersion D3 - organic acid is 3-(4-hydroxyphenyl)propionic acid
Dispersion D4 - organic acid is citric acid
Dispersion D5 - organic acid is 3,4-dihydroxyphenyl acetic acid
Dispersion D6 - organic acid is o-acetyl salicyclic acid

DISPERSION DD. - 3-(2-hydroxyphenyl)propionic acid

| | |
|---|---|
| 3-(2-hydroxyphenyl)propionic acid | 16.0 |
| dispersing and defoaming agents | 1.5 |
| water | 82.5 |

SOLUTION I - ascorbic acid

| | |
|---|---|
| ascorbic acid | 20 |
| water | 80 |

Filler Slurry - F slurry F1: CaCO$_3$ at 21% solids
slurry F2: magnesium stearate at 21% solids
slurry F3: magnesium hydroxide at 21% solids
slurry F4: zinc stearate
slurry F5: calcium stearate

| Material | Weight (g) |
|---|---|
| Coating Formulation I | |
| Dispersion A (chromogen-dye 1) | 7.4 |
| Dispersion B (developer) | 13.0 |
| Dispersion C (modifier-stearamide wax) | 1.9 |
| Dispersion D (organic acid) | 0.0 |
| Binder, 10% solution of polyvinyl alcohol | 15.0 |
| amorphous silicon dioxide slurry, 30% in water | 1.8 |
| slurry F | 0.0 |
| additives (rheology modifier, lubricant, optical brightener) | 4.0 |
| water | 56.9 |
| Coating Formulation II | |
| Dispersion A (chromogen-dye 1) | 7.4 |
| Dispersion B (developer) | 13.0 |
| Dispersion C (modifier-stearamide wax) | 1.9 |
| Dispersion D (organic acid) | 13.0 |
| binder, 10% solution of polyvinyl alcohol | 15.0 |
| amorphous silicon dioxide slurry, 30% solids | 1.8 |
| slurry F | 0.0 |
| additives (rheology modifier, lubricant, optical brightener) | 4.0 |
| water | 43.9 |
| Coating Formulation III | |
| Dispersion A (chromogen-dye 1) | 7.4 |
| Dispersion B (developer) | 13.0 |
| Dispersion C (modifier-stearamide wax) | 1.9 |
| Dispersion D (organic acid) | 0.0 |
| binder, 10% solution of polyvinyl alcohol | 15.0 |
| amorphous silicon dioxide slurry, 30% solids | 1.8 |
| slurry F | 10.0 |
| additives (rheology modifier, lubricant, optical brightener) | 4.0 |
| water | 46.9 |
| Coating Formulation IV | |
| Dispersion A (chromogen-dye 1) | 7.4 |
| Dispersion B (developer) | 0.0 |
| Dispersion C (modifier-stearamide wax) | 1.9 |
| Dispersion D (organic acid) | 13.0 |
| binder, 10% solution of polyvinyl alcohol | 15.0 |
| amorphous silicon dioxide slurry, 30% solids | 1.8 |
| slurry F | 10.0 |
| additives (rheology modifier, lubricant, optical brightener) | 4.0 |
| water | 46.9 |
| Coating Formulation V | |
| Dispersion A (chromogen-dye 1) | 7.4 |
| Dispersion B (developer) | 13.0 |
| Dispersion C (modifier-stearamide wax) | 1.9 |
| Dispersion D (organic acid) | 0.0 |
| binder, 10% solution of polyvinyl alcohol | 15.0 |
| amorphous silicon dioxide slurry, 30% solids | 1.8 |
| slurry F | 10.0 |
| additives (rheology modifier, lubricant, optical brightener) | 4.0 |
| water | 46.9 |
| Coating Formulation VI | |
| Dispersion A (chromogen-dye 1) | 7.4 |
| Dispersion B (developer) | 13.0 |
| Dispersion C (modifier-steramide wax) | 1.9 |
| Dispersion D (organic acid) | 13.0 |
| binder, 10% solution of polyvinyl alcohol | 15.0 |
| amorphous silicon dioxide slurry, 30% solids | 1.8 |
| slurry F | 10.0 |
| additives (rheology modifier, lubricant, optical brightener) | 4.0 |
| water | 33.9 |

LIST OF EXAMPLES

Example 1

Coating Formulation I Using:
Dispersion B1 (4,4'-diaminodiphenyl sulfone)

Example 2

Coating Formulation II Using:
Dispersion B1 (4,4'-diaminodiphenyl sulfone)
Dispersion D3 (3-(4-hydroxyphenyl)propionic acid)

Example 3

Coating Formulation III Using:
Dispersion B1 (4,4'-diaminodiphenyl sulfone)
F1 (CaCO$_3$)

Example 4

Coating Formulation IV Using:
Dispersion D3 (3-(4-hydroxyphenyl)propionic acid)
Slurry F1 (CaCO$_3$)

Example 5

Coating Formulation V Using:
Dispersion B1 (4,4'-diaminodiphenyl sulfone)
Slurry F2 (magnesium stearate)

Example 6

Coating Formulation VI Using:
Dispersion B1 (4,4'-diaminodiphenyl sulfone)
Dispersion D3 (3-(4-hydroxyphenyl)propionic acid)
slurry F1 ($CaCO_3$)

Example 7

Coating Formulation VI Using:
Dispersion B1 (4,4'-diaminodiphenyl sulfone)
Dispersion D3 (3-(4-hydroxyphenyl)propionic acid)
slurry F2 (magnesium stearate)

Example 8

Coating Formulation VI Using:
Dispersion B1 (4,4'-diaminodiphenyl sulfone)
Dispersion D3 (3-(4-hydroxyphenyl)propionic acid)
slurry F3 (magnesium hydroxide)

Example 9

Coating Formulation VI Using:
Dispersion B1 (4,4'-diaminodiphenyl sulfone)
Dispersion D3 (3-(4-hydroxyphenyl)propionic acid)
slurry F1 (calcium $CaCO_3$)

Example 10

Coating Formulation VI Using:
Dispersion B1 (4,4'-diaminodiphenyl sulfone)
Dispersion D3 (3-(4-hydroxyphenyl)propionic acid)
slurry F2 (magnesium stearate)

Example 11

Coating Formulation VI Using:
Dispersion B1 (4,4'-diaminodiphenyl sulfone)
Dispersion D3 (3-(4-hydroxyphenyl)propionic acid)
slurry F3 (magnesium hydroxide)

Example 12

Coating Formulation VI Using:
Dispersion B1 (4,4'-diaminodiphenyl sulfone)
Dispersion D3 (3-(4-hydroxyphenyl)propionic acid)
slurry F4 (zinc stearate)

Example 13

Coating Formulation VI Using:
Dispersion B1 (4,4'-diaminodiphenyl sulfone)
Dispersion D3 (3-(4-hydroxyphenyl)propionic acid)
slurry F5 (calcium stearate)

Comparative Example 14

Coating Formulation VI Using:
Dispersion B2 (Bisphenol S)
Dispersion D3 (3-(4-hydroxyphenyl)propionic acid)
slurry F1 ($CaCO_3$)

Comparative Example 15

Coating Formulation VI Using:
Dispersion B2 (Bisphenol S)
Dispersion D3 (3-(4-hydroxyphenyl)propionic acid)
slurry F2 (magnesium stearate)

Example 16

Coating Formulation VI Using:
Dispersion B1 (4,4'-diaminodiphenyl sulfone)
Dispersion D1 (coumaric acid)
slurry F1 ($CaCO_3$)

Example 17

Coating Formulation VI Using:
Dispersion B1 (4,4'-diaminodiphenyl sulfone)
Dispersion D1 (coumaric acid)
slurry F2 (magnesium stearate)

Example 18

Coating Formulation VI Using:
Dispersion B1 (4,4'-diaminodiphenyl sulfone)
Dispersion D1 (coumaric acid)
slurry F3 (magnesium hydroxide)

Example 19

Coating Formulation VI Using:
Dispersion B1 (4,4'-diaminodiphenyl sulfone)
slurry F4 (zinc stearate)

Example 20

Coating Formulation VI Using:
Dispersion B1 (4,4'-diaminodiphenyl sulfone)
Dispersion D1 (coumaric acid)
slurry F5 (calcium stearate)

Example 21

Coating Formulation VI Using:
Dispersion B1 (4,4'-diaminodiphenyl sulfone)
Dispersion D3 (3-(4-hydroxyphenyl)propionic acid)
slurry F1 ($CaCO_3$)

Example 22

Coating Formulation VI Using:
Dispersion B1 (4,4'-diaminodiphenyl sulfone)
Dispersion D3 (3-(4-hydroxyphenyl)propionic acid)
slurry F2 (magnesium stearate)

Example 23

Coating Formulation VI Using:
Dispersion B1 (4,4'-diaminodiphenyl sulfone)
Solution I (ascorbic acid)
slurry F1 ($CaCO_3$)

Example 24

Coating Formulation VI Using:
Dispersion B1 (4,4'-diaminodiphenyl sulfone)
Solution I (ascorbic acid)
slurry F2 (magnesium stearate)

Example 25

Coating Formulation VI Using:
Dispersion B1 (4,4'-diaminodiphenyl sulfone)
Dispersion D1 (coumaric acid)
slurry F1 ($CaCO_3$)

Example 26

Coating Formulation VI Using:
Dispersion B1 (4,4'-diaminodiphenyl sulfone)
Dispersion D1 (coumaric acid)
slurry F2 (magnesium stearate)

Example 27

Coating Formulation VI Using:
Dispersion B1 (4,4'-diaminodiphenyl sulfone)
Dispersion D5 (3,4-dihydroxyphenyl acetic acid)
slurry F1 ($CaCO_3$)

Example 28

Coating Formulation VI Using:
Dispersion B1 (4,4'-diaminodiphenyl sulfone)
Dispersion D5 (3,4-dihydroxyphenyl acetic acid)
slurry F2 (magnesium stearate)

Example 29

Coating Formulation VI Using:
Dispersion B1 (4,4'-diaminodiphenyl sulfone)
Dispersion DD (3-(2-hydroxyphenyl)propionic acid)
slurry F1 ($CaCO_3$)

Example 30

Coating Formulation VI Using:
Dispersion B1 (4,4'-diaminodiphenyl sulfone)
Dispersion DD (3-(2-hydroxyphenyl)propionic acid)
slurry F2 (magnesium stearate)

Example 31

Coating Formulation VI Using:
Dispersion B1 (4,4'-diaminodiphenyl sulfone)
Dispersion D2 (salicylic acid)
slurry F1 ($CaCO_3$)

Example 32

Coating Formulation VI Using:
Dispersion B1 (4,4'-diaminodiphenyl sulfone)
Dispersion D2 (Ssalicylic acid)
slurry F2 (magnesium stearate)

Example 33

Coating Formulation VI Using:
Dispersion B1 (4,4'-diaminodiphenyl sulfone)
Dispersion D4 (citric acid)
slurry F1 ($CaCO_3$)

Example 34

Coating Formulation VI Using:
Dispersion B1 (4,4'-diaminodiphenyl sulfone)
Dispersion D4 (citric acid)
slurry F2 (magnesium stearate)

Example 35

Coating Formulation IV Using:
Dispersion D6 (o-acetyl salicylic acid)
slurry F2 (magnesium stearate)

Example 36

Coating Formulation VI Using:
Dispersion B1 (Developer 4,4')
Dispersion D6 (o-acetyl salicylic acid)
slurry F2 (magnesium stearate)

Example 37

Coating Formulation VI Using:
Dispersion B1 (Developer 4,4')
Dispersion D6 (o-acetyl salicylic acid)
slurry F2 (magnesium stearate)

Tabulated Results of Examples 1-37

Samples from the examples 1-37 described above were imaged using an Atlantek 400 at a medium energy setting. The thermal Image intensity was recorded using a Gretag densitometer. The units of image density are referred to as optical density units, also known as o.d.u. The higher the o.d.u, the more intense or blacker the image is. The brightness readings of the samples were also measured and recorded.

In the Brightness UVEX readings, the UV component of the brightness was filtered out so as not to introduce any bias from the fluorescent or optical brighteners that is added into a coating formulation.

The data shown below depicts examples 1-37, describing, weight of coat ("WOC"), intensity, and brightness. Weight of coats were determined analytically, whereby the amount of dye was extracted and quantified using a spectrophotometer.

TABLE 3

General overview of the examples and data.

| | | | | | | 1st bar Gretag | |
|---|---|---|---|---|---|---|---|
| | | THERMAL SYSTEM | | | | | |
| Example | Developer | Organic Acid | Filler | Leuco Dye | WOC #/ream | Intensity o.d. | Brightness UVEX |
| 1 | Developer 4,4' | — | — | dye 1 | 3.0 | 0.83 | 89.0 |
| 2 | Developer 4,4' | 3-(4-hydroxyphenyl)propionic acid | — | dye 1 | 3.0 | 1.53 | 89.0 |
| 3 | Developer 4,4' | — | $CaCO_3$ | dye 1 | 4.6 | 0.90 | 89.0 |

TABLE 3-continued

General overview of the examples and data.

| | THERMAL SYSTEM | | | | | 1st bar Gretag | |
|---|---|---|---|---|---|---|---|
| Example | Developer | Organic Acid | Filler | Leuco Dye | WOC #/ream | Intensity o.d. | Brightness UVEX |
| 4 | — | 3-(4-hydroxyphenyl)propionic acid | CaCO$_3$ | dye 1 | 4.9 | 0.63 | 87.3 |
| 5 | Developer 4,4' | — | magnesium stearate | dye 1 | 5.6 | 0.70 | 89.0 |
| 6 | Developer 4,4' | 3-(4-hydroxyphenyl)propionic acid | CaCO$_3$ | dye 1 | 4.8 | 1.34 | 88.4 |
| 7 | Developer 4,4' | 3-(4-hydroxyphenyl)propionic acid | magnesium stearate | dye 1 | 5.0 | 2.05 | 84.0 |
| 8 | Developer 4,4' | 3-(4-hydroxyphenyl)propionic acid | magnesium hydroxide | dye 1 | 5.4 | 1.50 | 88.0 |
| 9 | Developer 4,4' | 3-(4-hydroxyphenyl)propionic acid | CaCO$_3$ | dye 1 | 3.1 | 1.00 | 89.0 |
| 10 | Developer 4,4' | 3-(4-hydroxyphenyl)propionic acid | magnesium stearate | dye 1 | 3.2 | 1.60 | 85.7 |
| 11 | Developer 4,4' | 3-(4-hydroxyphenyl)propionic acid | magnesium hydroxide | dye 1 | 2.8 | 1.20 | 88.7 |
| 12 | Developer 4,4' | 3-(4-hydroxyphenyl)propionic acid | zinc stearate | dye 1 | 2.6 | 1.50 | 89.6 |
| 13 | Developer 4,4' | 3-(4-hydroxyphenyl)propionic acid | calcium stearate | dye 1 | 2.8 | 1.40 | 84.1 |
| 14 | Bis S | 3-(4-hydroxyphenyl)propionic acid | CaCO$_3$ | dye 1 | 3.7 | 2.49 | 78.0 |
| 15 | Bis S | 3-(4-hydroxyphenyl)propionic acid | magnesium stearate | dye 1 | 3.6 | 2.48 | 69.6 |
| 16 | Developer 4,4' | coumaric acid | CaCO$_3$ | dye 1 | 2.7 | 1.23 | 89.1 |
| 17 | Developer 4,4' | coumaric acid | magnesium stearate | dye 1 | 2.6 | 1.43 | 89.1 |
| 18 | Developer 4,4' | coumaric acid | magnesium hydroxide | dye 1 | 2.6 | 1.19 | 88.7 |
| 19 | Developer 4,4' | coumaric acid | zinc stearate | dye 1 | 2.6 | 1.65 | 89.1 |
| 20 | Developer 4,4' | coumaric acid | calcium stearate | dye 1 | 2.6 | 1.41 | 89.3 |
| 21 | Developer 4,4' | 3-(4-hydroxyphenyl)propionic acid | CaCO$_3$ | dye 1 | 2.4 | 1.01 | 88.9 |
| 22 | Developer 4,4' | 3-(4-hydroxyphenyl)propionic acid | magnesium stearate | dye 1 | 2.2 | 1.38 | 86.4 |
| 23 | Developer 4,4' | ascorbic acid | CaCO$_3$ | dye 1 | 2.5 | 0.90 | 82.4 |
| 24 | Developer 4,4' | ascorbic acid | magnesium stearate | dye 1 | 2.1 | 1.08 | 84.9 |
| 25 | Developer 4,4' | coumaric acid | CaCO$_3$ | dye 1 | 2.6 | 1.34 | 88.8 |
| 26 | Developer 4,4' | coumaric acid | magnesium stearate | dye 1 | 2.4 | 1.43 | 88.9 |
| 27 | Developer 4,4' | 3,4-dihydroxyphenyl acetic acid | CaCO$_3$ | dye 1 | 2.3 | 0.93 | 80.9 |
| 28 | Developer 4,4' | 3,4-dihydroxyphenyl acetic acid | magnesium stearate | dye 1 | 2.4 | 1.37 | 79.5 |
| 29 | Developer 4,4' | 3-(2-hydroxyphenyl)propionic acid | CaCO$_3$ | dye 1 | 2.4 | 1.00 | 89.0 |
| 30 | Developer 4,4' | 3-(2-hydroxyphenyl)propionic acid | magnesium stearate | dye 1 | 2.2 | 1.38 | 84.8 |
| 31 | Developer 4,4' | salicylic acid | CaCO$_3$ | dye 1 | 2.4 | 1.07 | 84.8 |
| 32 | Developer 4,4' | salicylic acid | magnesium stearate | dye 1 | 2.5 | 1.29 | 83.6 |
| 33 | Developer 4,4' | citric acid | CaCO$_3$ | dye 1 | 2.3 | 0.70 | 89.1 |
| 34 | Developer 4,4' | citric acid | magnesium stearate | dye 1 | 2.1 | 1.30 | 85.0 |
| 35 | — | o-acetyl salicylic acid | magnesium stearate | dye 1 | 2.5 | 0.40 | 88.6 |
| 36 | Developer 4,4' | o-acetyl salicylic acid | magnesium stearate | dye 1 | 1.7 | 1.00 | 86.5 |
| 37 | Developer 4,4' | o-acetyl salicylic acid | magnesium stearate | dye 1 | 2.7 | 1.37 | 85.9 |

/ream is pounds per ream based on a 3300 sq. ft. ream. 1 lb per 3300 sq. ft. = 0.45 kg/306.58 sq. meters.

Figure 1:
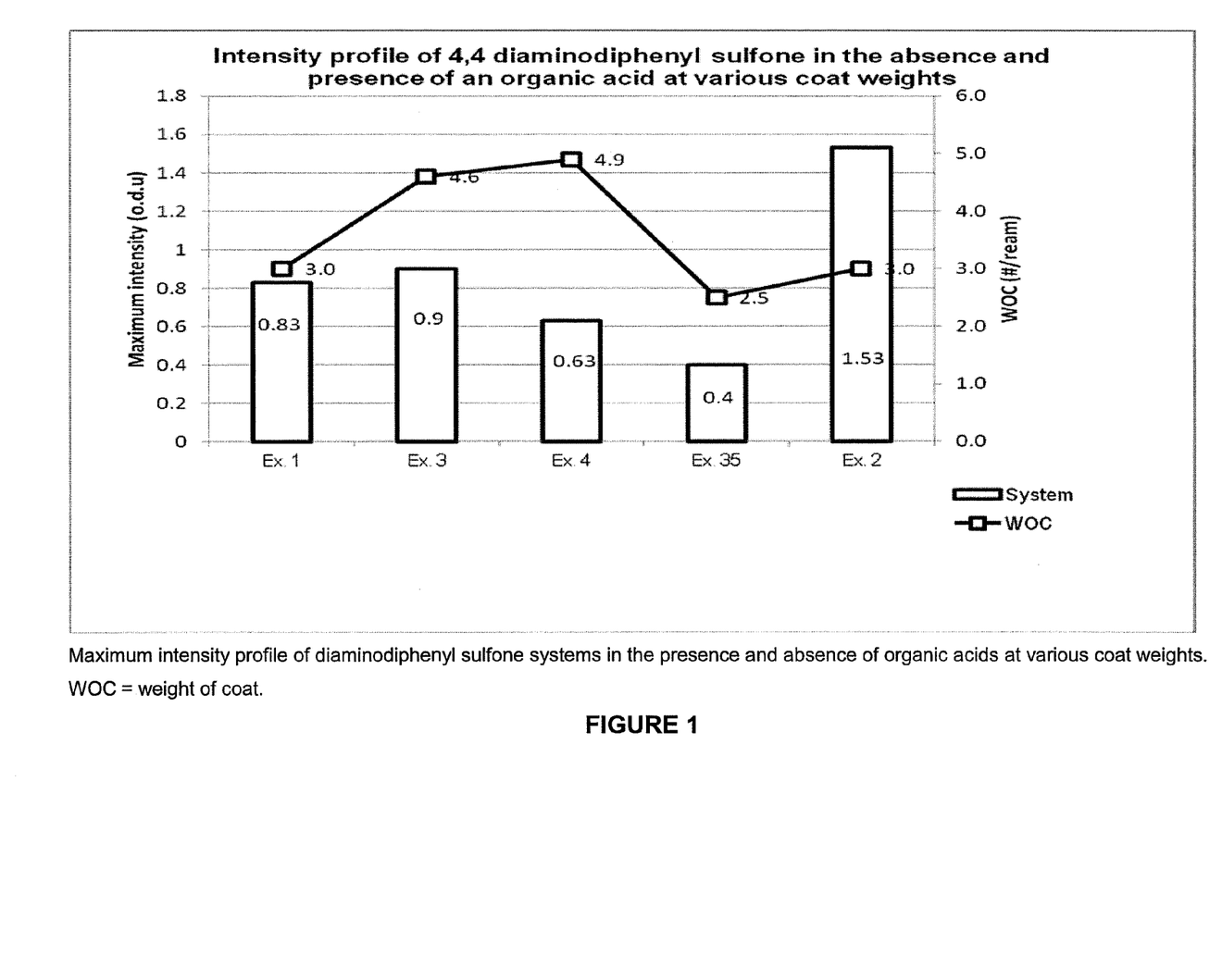
FIG. 1 depicts intensity of thermal record system with 4,4'-diaminodiphenyl sulfone in the absence and presence of an organic acid according to the invention.
Figure 2:
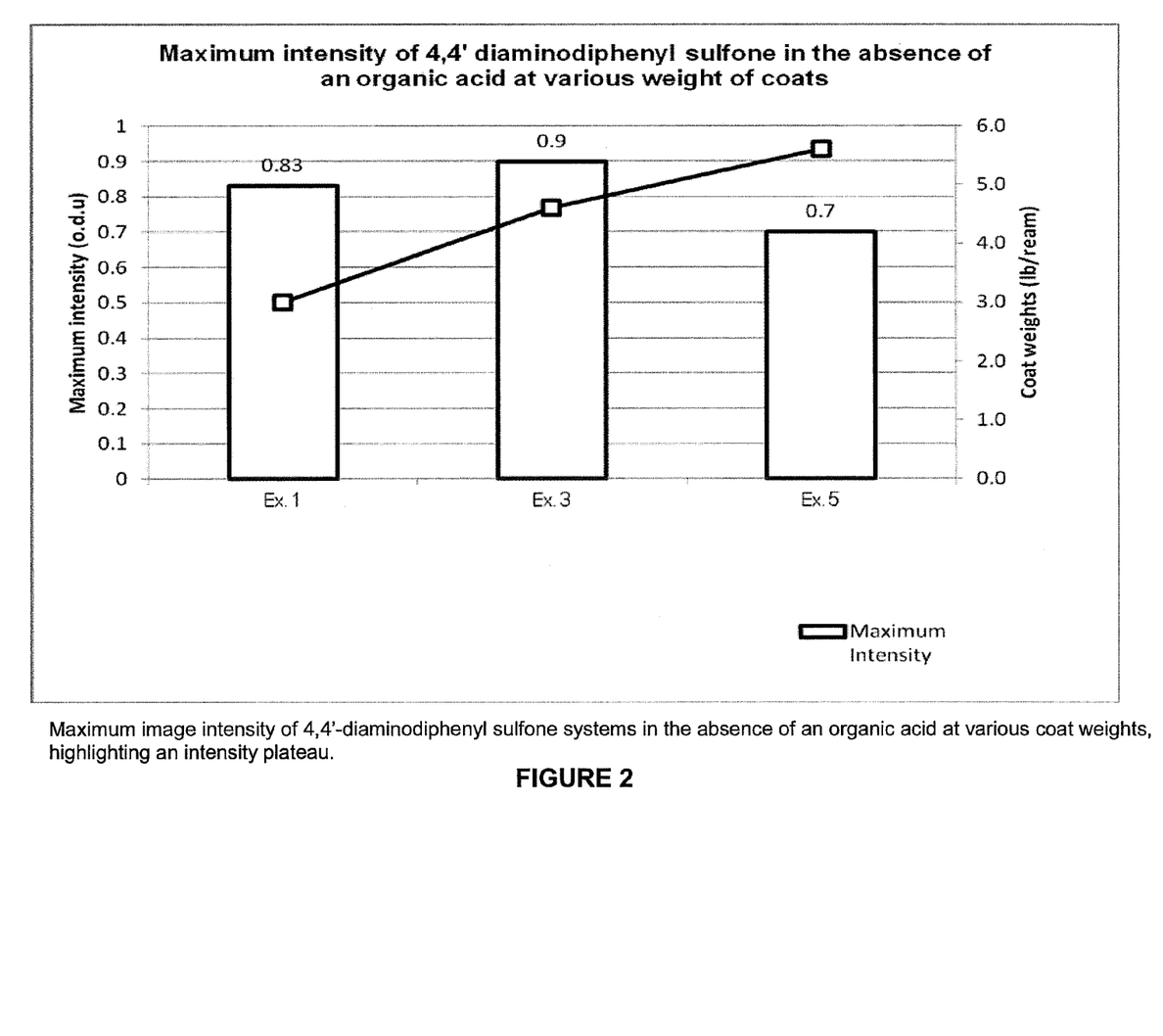
FIG. 2 depicts the intensity of thermal record systems in the absence of an organic acid at various weight of coats.
Figure 3:
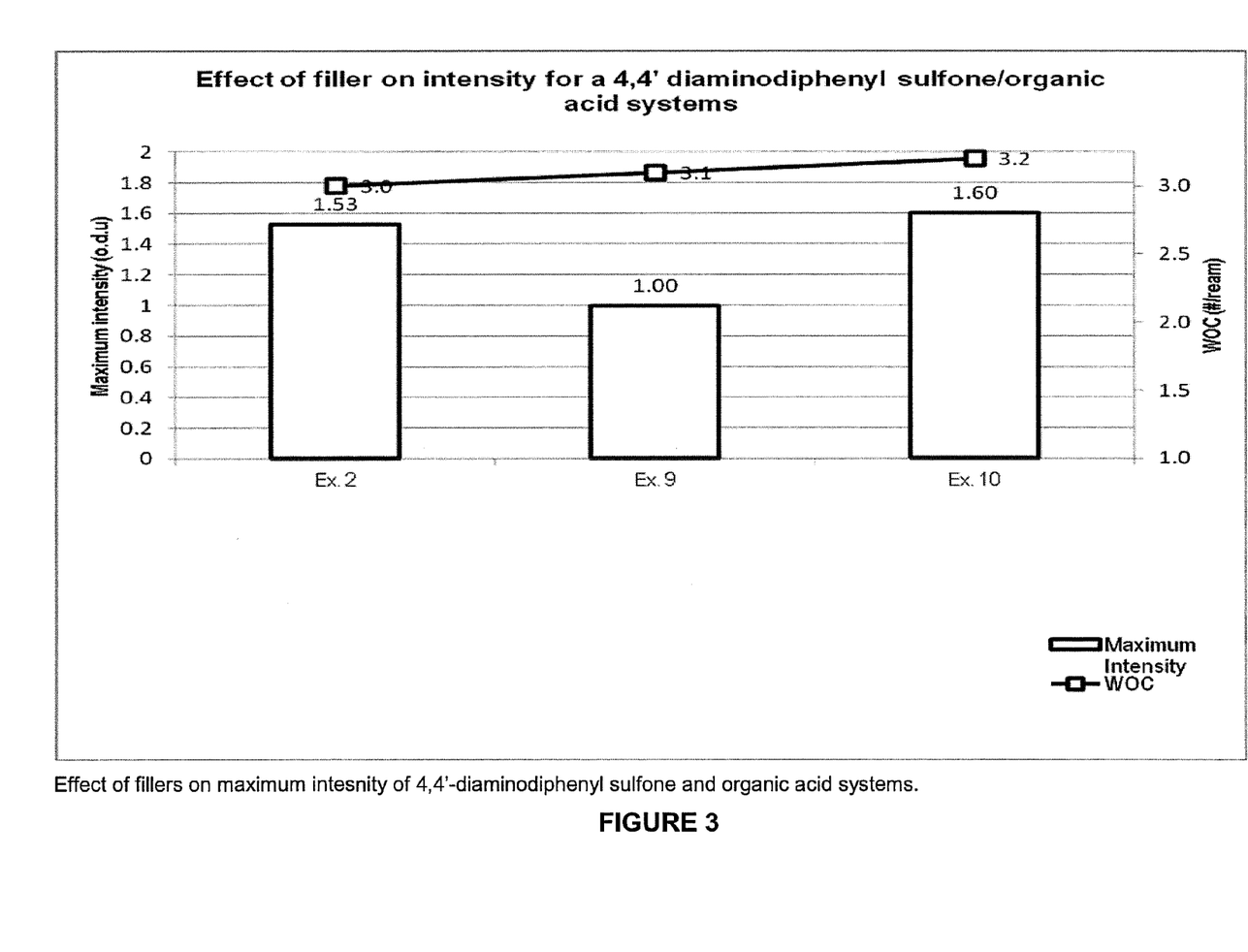
FIG. 3 depicts the effects of filler on intensity on thermal record systems according to the invention.

In this invention, a significant and considerable increase in image intensity is obtained when an organic acid is used in combination with 4,4'-diaminodiphenyl sulfone and/or 3,3'-diaminodiphenyl sulfone with a color former. An organic acid alone, i.e. with no diaminodiphenyl sulfone, in the presence of a color former yields a thermal image lacking strong intensity (see Example 4 and 35, and FIG. 1). This held true even at weight of coats as high as 5.6#/ream (for Example 4). Diamino diphenyl sulfone and organic acid used in combination surprisingly achieve an intensity boost (see example 2 and FIG. 1). When used in combination, high image intensities and at much reduced weight of coats are achieved. Diaminodiphenyl sulfone system in the absence of the acid gets saturated in terms of image intensity. This is reflected by the fact that the intensity does not increase as the coat weight increases (see examples 1,3, and 5, and FIG. 2). Example 5 uses a different filler. Examples 2 and 10 show the effect on intensity in the presence and absence of magnesium stearate.

The filler further enhances the image intensity of the 4,4'-diaminodiphenyl sulfone. For example, the substitution of calcium carbonate, a typical filler used in direct thermal coatings, with magnesium stearate, yields an improved intensity when used with an organic acid. Optionally, and optimally the product is topcoated. In non-topcoated products, calcium carbonate can be added to the thermal coating in part to address printhead residue. In topcoated products, fillers, such as calcium carbonate or kaolin clays are added, usually at lower concentrations.

Comparing examples, 2,9, and 10, these examples demonstrate that $CaCO_3$ can mask the image but that magnesium stearate improves the image. Ideally, the use of no filler is preferred (Example 2). Magnesium stearate can be optionally added, does not display masking and enhance intensity.

When other fillers were evaluated including magnesium hydroxide, calcium stearate, and zinc stearate, at a given coat weight, magnesium stearate~zinc stearate>calcium stearate>magnesium hydroxide>calcium carbonate.

Surprisingly, the benefits seen with magnesium stearate appear to be unique to the two diaminodiphenyl sulfones This is based on the examples, 14 and 15 using Bisphenol S as the developer. For example 14, samples were prepared using $CaCO_3$, whereas samples from example 15 were generated using magnesium stearate. The results showed that at equal weight of coats, the intensity of both systems were equivalent, suggesting that the Bis S/organic acid system is not as sensitive to the presence of fillers or modifiers as in the diaminodiphenyl sulfone/organic acid systems.

Figure 4:
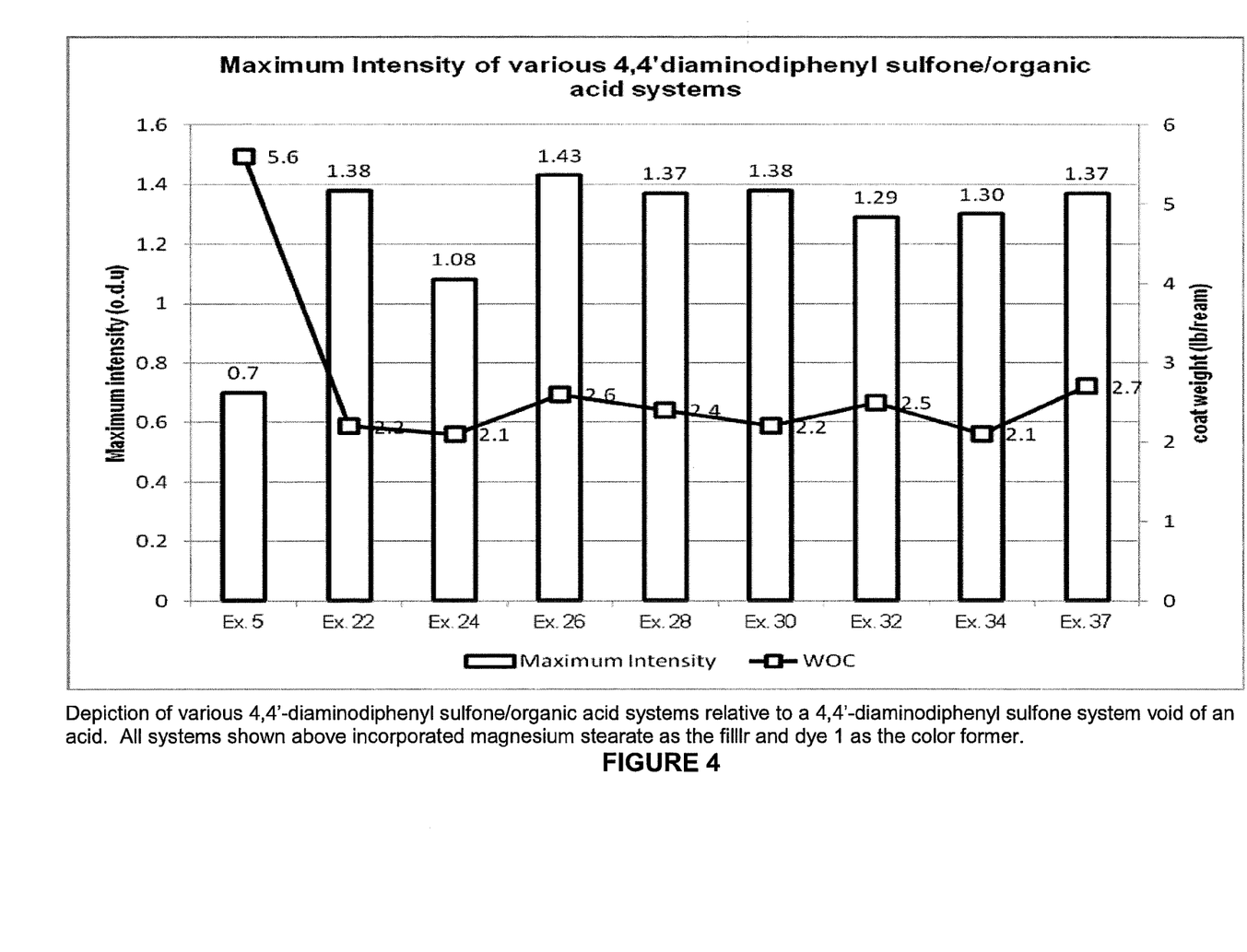
FIG. 4 depicts various 4,4'-diaminodiphenyl sulfone and organic acid systems compared to systems without organic acid.

The examples demonstrate the benefits on image intensity by incorporating organic acids into 4,4' diaminodiphenyl sulfone systems utilizing a series of various fillers and the color former dye 2 (see FIG. 4). Other leuco dyes would also be functional in a diaminodiphenyl sulfone/organic acid/magnesium stearate record material coating.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Uses of singular terms such as "a," "an," are intended to cover both the singular and the plural, unless otherwise indicated herein or clearly contradicted by context. The terms "comprising," "having," "including," and "containing" are to be construed as open-ended terms. All references, including publications, patent applications, and patents, cited herein are hereby incorporated by reference. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims.

The invention claimed is:

1. A thermally-responsive record material, substantially free of aromatic isocyanate, the record material comprising a support having provided thereon a heat-sensitive composition comprising:
   a substantially colorless color former;
   a developer material selected from the group consisting of 4,4'-diaminodiphenylsulfone and 3,3'-diaminodiphenylsulfone, which upon being heated react with said dye precursor to develop color;
   an organic acid;
   and a binder material.

2. The thermally-responsive record material according to claim 1 wherein the organic acid is a compound according to the formula wherein each $R^1$ is independently selected from carboxy, hydrogen or hydroxyl, wherein n is an integer from 1 to 4;
wherein $R^2$ is selected from carboxy, alkenecarboxy, alkcarboxy, alkanoate, and alkyl alkanoate.

3. The thermally-responsive record material according to claim 2 wherein the organic acid is o-acetyl salicyclic acid, coumaric acid, vanillic acid, cinnamic acid, salicylic acid, 3-(4-hydroxyphenyl)propionic acid, 2-(2-hydroxyphenyl) propionic acid, or 3,4-dihydroxyphenyl acetic acid.

4. The thermally-responsive record material according to claim 1 wherein the organic acid is selected from the group consisting of alkanedienoic acid, alkanedioic acid, hydroxyalkanetricarboxylic acid, and dihydroxyfuranone.

5. The thermally-responsive record material according to claim 4 wherein the organic acid is citric acid, ascorbic acid, sorbic acid, lactic acid or succinic acid.

6. The thermally-responsive record material according to claim 1 wherein the heat-sensitive composition comprises in addition a modifier compound.

7. The thermally responsive record material according to claim 6 wherein the modifier compound is stearamide wax.

8. The thermally responsive record material according to claim 6 wherein the modifier compound is selected from the group consisting of 1,2-diphenoxy ethane, dimethyl diphenoxy ethane, dimethyl phthalate and a fatty amide.

9. The thermally-responsive record material according to claim 1 wherein the heat sensitive composition includes in addition a metal stearate.

10. The thermally responsive record material according to claim 9 wherein the metal stearate is magnesium stearate.

11. The thermally-responsive record material according to claim 1, wherein the substantially colorless color former comprises a fluoran compound of the formula wherein $R_1$ is hydrogen or alkyl wherein $R_2$ is hydrogen or alkaryl;

wherein $R_3$ is aryl when $R_2$ is hydrogen, or alkaryl when $R_2$ is alkaryl;

$R_4$ and $R_5$ are each independently selected from alkyl, aralkyl; or $R_4$ and $R_5$ form a four carbon ring pyrrolidine structure.

12. The thermally-responsive record material according to claim 11 wherein the fluoran is selected from the group consisting of:

1

2

3

4

5

6 and,

7

13. The thermally-responsive record material according to claim 11 wherein the fluoran is selected from the group consisting of:

1

2

3

4

5 and,

-continued

6

.

14. The thermally-responsive record material according to claim 1 wherein the heat sensitive composition is applied onto the support at from 2 to 8 gsm.

15. The thermally-responsive record material according to claim 1 having an ANSI grade of B or better.

16. The thermally-responsive record material according to claim 1 wherein the record material includes in addition a polymeric top coat.

17. The thermally response record material according to claim 1 wherein the ratio by weight of developer to color former is from 0.5:1 to 5:1.

18. The thermally responsive record material according to claim 1 wherein the modifier to color former ratio by weight is form 0.1:1 to 4:1.

19. An improved bar code comprising a thermally responsive record material according to claim 1.

20. The improved bar code according to claim 19 having an ANSI grading of C or better.

21. The improved bar code according to claim 19 wherein the developer is selected from 4,4'-diaminodiphenylsulfone and 3,3'-diaminodiphenylsulfone, and the flouran dye is selected from group consisting of:

3-diethylamino-6-methyl1-7-(2',4'dimethyl aniline)fluoran, 3-dibutylamino-6-methyl-7-anilino fluoran, 3-diethylamino-6-methyl-7-(3'-methylanilino)fluoran, 3-diethylamino-6-methyl-7-anilinofluoran, 3-pyrrolidino-6-methyl-7-anilino fluoran, and 3-diethylamino-7-(dibenzylamino)fluoran, and, including in addition magnesium stearate.

* * * * *